(12) United States Patent
Park et al.

(10) Patent No.: US 9,258,813 B2
(45) Date of Patent: Feb. 9, 2016

(54) CHANNEL ACCESS METHOD AND APPARATUS USING THE SAME IN WIRELESS LOCAL AREA NETWORK SYSTEM

(75) Inventors: Jong Hyun Park, Anyang-si (KR); Suh Wook Kim, Anyang-si (KR); Eun Sun Kim, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 139 days.

(21) Appl. No.: 14/009,524

(22) PCT Filed: Apr. 26, 2012

(86) PCT No.: PCT/KR2012/003227
§ 371 (c)(1),
(2), (4) Date: Oct. 2, 2013

(87) PCT Pub. No.: WO2012/148183
PCT Pub. Date: Nov. 1, 2012

(65) Prior Publication Data
US 2014/0023053 A1   Jan. 23, 2014

Related U.S. Application Data

(60) Provisional application No. 61/480,380, filed on Apr. 29, 2011.

(51) Int. Cl.
*H04W 74/00* (2009.01)
*H04W 72/04* (2009.01)
(Continued)

(52) U.S. Cl.
CPC ............ *H04W 72/042* (2013.01); *H04W 48/10* (2013.01); *H04W 74/002* (2013.01); *H04W 74/006* (2013.01); *H04W 8/186* (2013.01); *H04W 48/02* (2013.01); *H04W 74/0825* (2013.01)

(58) Field of Classification Search
CPC .............. H04W 74/002; H04W 84/12; H04W 74/0808; H04W 72/021; H04W 4/005; H04W 28/0215; H04W 48/10; H04W 8/186; H04W 48/02; H04W 72/0446; H04W 36/0011; H04W 76/02; H04W 72/08; H04W 4/06; H04W 52/0219; H04W 80/02; H04L 5/0092; H04L 67/2861; H04L 67/303; H04L 41/0803; G06F 17/30312; G01D 4/004
USPC ......... 370/328, 329, 336, 331, 311, 312, 338, 370/447, 445, 392, 347; 455/517, 41.2, 455/452.1, 435.1
See application file for complete search history.

(56) References Cited

U.S. PATENT DOCUMENTS

2004/0053622 A1* 3/2004 Nakakita ............. H04L 63/0428
455/450
2006/0164969 A1* 7/2006 Malik et al. ................... 370/203
(Continued)

FOREIGN PATENT DOCUMENTS

JP      2009-509469 A    3/2009
JP      2010-519875 A    6/2010
(Continued)

OTHER PUBLICATIONS

3GPP SA WG2 Temporary Document, TD S2-102634, "Randomisation in Access Stratum", 3GPP TSG SA WG2 Meeting #79, May 10-14, 2010.

*Primary Examiner* — Edan Orgad
*Assistant Examiner* — Ivan O Latorre
(74) *Attorney, Agent, or Firm* — Dentons US LLP

(57) ABSTRACT

A method of apparatus for channel access in a wireless local area network is provided. A station receives a channel access control message including group indication information indicating a group of stations allowed to access a channel from an access point. The station attempts contention for accessing the channel if the station belongs to the group indicated by the group indication information.

15 Claims, 9 Drawing Sheets

(51) Int. Cl.
*H04W 48/10* (2009.01)
*H04W 8/18* (2009.01)
*H04W 48/02* (2009.01)
*H04W 74/08* (2009.01)

(56) References Cited

U.S. PATENT DOCUMENTS

| | | | | |
|---|---|---|---|---|
| 2008/0170497 A1* | 7/2008 | Jeong | ............... | H04W 28/08 370/230 |
| 2009/0047974 A1* | 2/2009 | Quinn | ............... | H04W 8/005 455/456.1 |
| 2009/0067389 A1 | 3/2009 | Lee et al. | | |
| 2009/0135836 A1* | 5/2009 | Veillette | ............. | G01D 4/004 370/400 |
| 2009/0138617 A1* | 5/2009 | Veillette | ............. | 709/238 |
| 2009/0323608 A1* | 12/2009 | Adachi | ............. | H04W 72/0453 370/329 |
| 2010/0142426 A1* | 6/2010 | Taniuchi et al. | ............. | 370/311 |
| 2010/0189021 A1* | 7/2010 | He | ............. | H04W 52/00 370/311 |
| 2011/0044303 A1* | 2/2011 | Ji et al. | ............. | 370/338 |
| 2011/0211219 A1* | 9/2011 | Bradley | ............. | G06F 3/12 158/1.15 |

FOREIGN PATENT DOCUMENTS

| | | |
|---|---|---|
| KR | 10-0884380 B1 | 2/2009 |
| WO | 2007-038118 A2 | 4/2007 |
| WO | 2008-104095 A1 | 9/2008 |

* cited by examiner

| Element ID | Length | STA Type Info |
|---|---|---|

Octets:    1         1        Variable

Figure 7

| STA Type | Duty Cycle | Listen Interval |
|---|---|---|

Octets:     1          1              2

Figure 8

|  B0-B1  |  B2-B4  |  B5-B7  |
|---|---|---|
| Application | Traffice | Location |

Bits:      2          3          3

Figure 9

| Element ID | Length | Group Index |
|---|---|---|

Octets:       1          1        Variable

Figure 12

| Element ID | Length | CAC Offset | CAC Duration | Group Index |
|---|---|---|---|---|
| 1 | 1 | 1 | 1 | Variable |

Octets:

CHANNEL ACCESS METHOD AND APPARATUS USING THE SAME IN WIRELESS LOCAL AREA NETWORK SYSTEM

This Application is a 35 U.S.C. §371 National Stage Entry of International Application No. PCT/KR2012/003227, filed Apr. 26, 2012 and claims the benefit of U.S. Provisional Application No. 61/480,380, filed Apr. 29, 2011, all of which are incorporated by reference in their entirety herein.

TECHNICAL FIELD

The present invention relates to wireless communication and, more particularly, to a channel access method in a Wireless Local Area Network (WLAN) system.

BACKGROUND ART

With the recent development of information communication technology, a variety of wireless communication techniques are being developed. From among them, a Wireless Local Area Network (WLAN) is a technique for wirelessly accessing the Internet at homes or companies or in specific service providing areas by using portable terminals, such as a Personal Digital Assistant (PDA), a laptop computer, and a Portable Multimedia Player (PMP), based on wireless frequency technology.

A lot of standardization tasks are being performed since Institute of Electrical and Electronics Engineering (IEEE) 802 (i.e., the standardization organization of WLAN technology) was established on February, 1980. WLAN technology initially supported a speed of 1 to 2 Mbps through frequency hopping, band spreading, and infrared communication by using a frequency of 2.4 GHz according to IEEE 802.11, but recently may support a maximum speed of 54 Mbps by using Orthogonal Frequency Division Multiplexing (OFDM). In addition, in IEEE 802.11, standardizations for various techniques, such as the improvement of Quality of Service (QoS), Access Point (AP) protocol compatibility, security enhancement, radio resource measurement, wireless access vehicular environments, fast roaming, a mesh network, interworking with an external network, and wireless network management, are being put to practical use or developed.

A basic access mechanism of IEEE 802.11 Medium Access Control (MAC) is a Carrier Sense Multiple Access with Collision Avoidance (CSMA/CA) mechanism associated with binary exponential back-off. The CSMA/CA mechanism is also called a Distributed Coordination Function (DCF) of IEEE 802.11 MAC, and it basically adopts a "listen before talk" access mechanism. In this type of an access mechanism, a Station (STA) listens to a wireless channel or medium prior to transmission. If, as a result of the listening, the medium is detected as not being used, the listening STA starts its own transmission. If, as a result of the listening, the medium is detected as being used, however, the listening STA does not start its own transmission and enters a delay period which is determined by the binary exponential back-off algorithm.

The CSMA/CA mechanism also includes virtual carrier sensing in addition to physical carrier sensing where an STA directly listens to a medium. The virtual carrier sensing is for supplementing the limits of the physical carrier sensing, such as a hidden node problem. For the virtual carrier sensing, IEEE 802.11 MAC uses a Network Allocation Vector (NAV). The NAV is a value that enables an STA, now using a medium or having a right to use the medium, to indicate the time remaining until the medium is available for another STA. Accordingly, the value of the NAV corresponds to the period where the use of a medium is reserved by an STA that transmits a relevant frame.

One of procedures of setting the NAV is a procedure of exchanging a Request To Send (RTS) frame and a Clear To Send (CTS) frame. The RTS frame and the CTS frame include information capable of delaying the transmission of frames by reception STAs by informing the reception STAs of upcoming frame transmission. The information may be included in, for example, the duration fields of the RTS frame and the CTS frame. After the RTS frame and the CTS frame are exchanged, a source STA transmits an actual frame to a destination STA.

The CSMA/CA-based channel access method, however, has a problem in that efficiency is not high. For example, if a PHY Service Access Point (SAP) provides a throughput of 1 Gbps, a MAC SAP may provide only about 50 to 60% of the throughput of 1 Gbps provided by the PHY SAP. Furthermore, if a plurality of STAs is associated with one Access Point (AP), overall efficiency of a WLAN system may be deteriorated. An individual STA has to access a channel through contention and may find it further difficult to obtain an opportunity to send a radio frame using a Wireless Medium (WM).

SUMMARY OF INVENTION

Technical Problem

The present invention provides a method and apparatus for channel access in a wireless local area network.

The present invention provides a method of transmitting management information, which may be used in the channel access of wireless apparatuses operating in a WLAN system.

Technical Solution

In an aspect, a channel access method based on a group in a Wireless Local Area Network (WLAN) system is provided. The method may include receiving a channel access control message, including group indication information indicating a group of STAs allowed to access a channel, from an Access Point (AP); and attempting contention for accessing the channel, if the STA belongs to the group indicated by the group indication information.

The channel access control message may further include offset information indicating a start time of the contention for accessing the channel and duration information indicating duration for which the contention for accessing the channel is allowed.

The channel access method may further include at least one of application information, traffic pattern information, duty cycle information, location information, and listen interval information of the STA.

The AP may determine the group to which the STA belongs based on the type information.

In another aspect, a station (STA) operating in a Wireless Local Area Network (WLAN) supporting a channel access method based on a group is provided. The STA may include a processor configured to receive a channel access control message, including group indication information indicating a group of STAs allowed to access a channel, from an Access Point (AP) and attempt contention for accessing the channel, if the STA belongs to the group indicated by the group indication information.

The channel access control message may further include offset information indicating a start time of the contention for accessing the channel, and duration information indicating duration for which the contention for accessing the channel is allowed.

The processor may be configured to transmit type information of the STA to the AP and receive group information, indicating the group to which the STA belongs, from the AP.

Advantageous Effects

In accordance with an embodiment of the present invention, a number of STAs are grouped according to their characteristics and access the channel. Accordingly, the loss of wireless resources occurring owing to a channel access procedure can be reduced. Furthermore, in a system in which a number of STAs are managed by one AP, a method of providing management information necessary to group a number of the STAs is provided. Accordingly, an improved system throughput can be obtained as compared with a conventional channel access method.

DESCRIPTION OF DRAWINGS

FIG. 7 shows an example of a format of the STA Type Info field.

FIG. 8 shows a detailed example of pieces of information that may be included in the STA Type field of FIG. 7.

FIG. 9 is a block diagram of an example of a format of a Group Index element including group index information.

FIG. 12 shows an example of a Channel Access Control (CAC) Information Element (IE) format which may be used in the channel access method based on a group.

MODE FOR INVENTION

Figure 1:
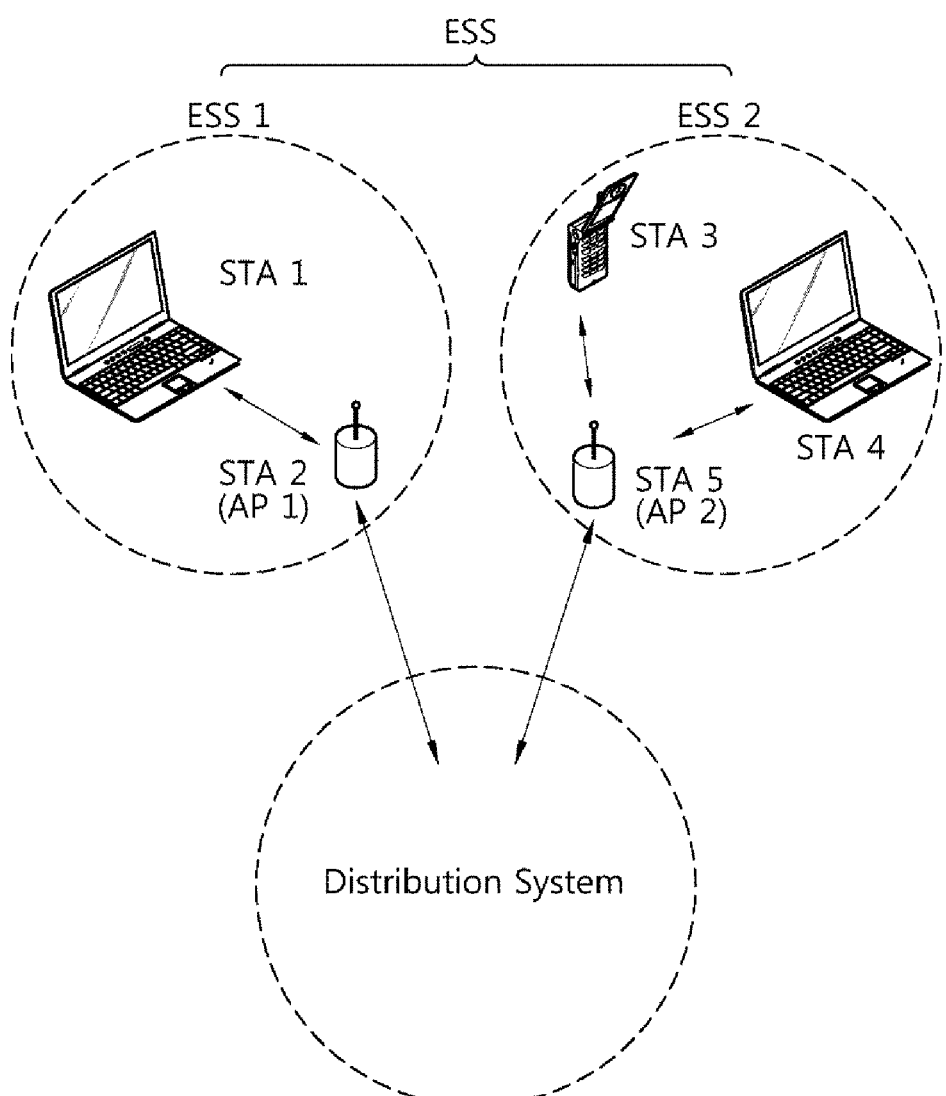
FIGS. 1 and 2 are schematic diagrams showing the configurations of a WLAN system to which an embodiment of the present invention may be applied.
Figure 2:
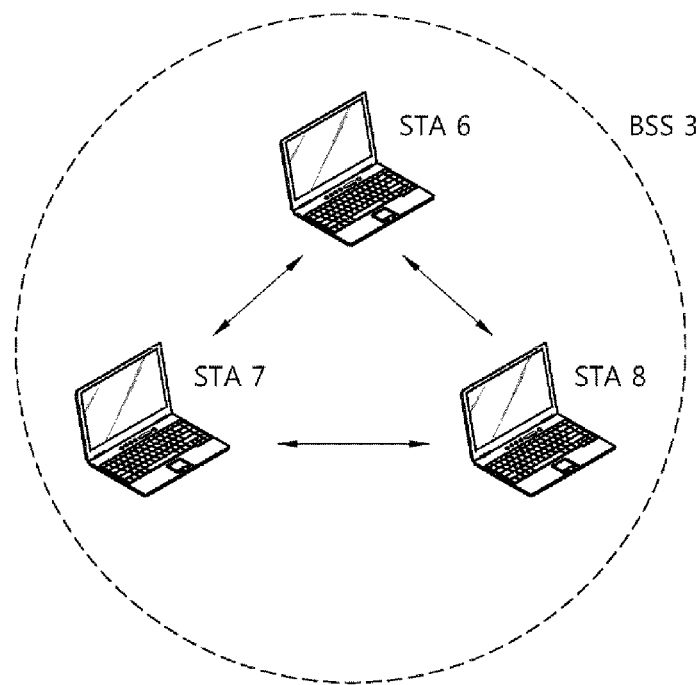

FIGS. 1 and 2 are schematic diagrams showing the configurations of a WLAN system to which an embodiment of the present invention may be applied.

Referring to FIGS. 1 and 2, the WLAN system includes one or more Basic Service Sets (BSSs). The BSS is a set of stations (STAs) that are successfully synchronized with one another for communication, but is not a concept indicating a specific area. A BSS may be divided into an infrastructure BSS and an independent BSS (IBSS). The infrastructure BSS is shown in FIG. 1, and the IBSS is shown in FIG. 2.

The infrastructure BSSs (BSS1 and BSS2) include one or more STAs (STA1, STA3, and STA4), an Access Point (AP) (i.e., an STA providing distribution service), and a Distribution System (DS) coupling a plurality of Aps (AP1 and AP2). Meanwhile, in the IBSS, all STAs consist of mobile STAs (STA6, STA7, and STA8) because an AP is not included. Furthermore, all the STAs form a self-contained network because access to a DS is not permitted.

An STA is a functional entity, including Medium Access Control (MAC) according to the regulations of IEEE 802.11 and a physical layer interface for a Wireless Medium (WM). In a broad sense, an STA includes both an AP and a non-AP STA. An STA for wireless communication includes a processor and a transceiver and may further include a user interface, display means, etc. The processor is a functional unit configured to generate a frame to be transmitted over a wireless network or to process a frame received over the wireless network. The processor performs several functions for controlling an STA. Furthermore, the transceiver is functionally coupled to the processor and configured to transmit and receive frames over a wireless network for an STA.

Mobile terminals manipulated by users, from among STAs, include non-AP STAs (STA1, STA3, STA4, STA6, STA7, and STA8). When a mobile terminal is simply called an STA, it also refers to a non-AP STA. A non-AP STA may also be called another terminology, such as a Wireless Transmit/Receive Unit (WTRU), User Equipment (UE), a Mobile Station (MS), a Mobile Terminal (MT), or a Mobile Subscriber Unit (MSU).

Furthermore, the AP (AP1 or AP2) is a functional entity for providing access to the DS via a WM for STAs associated therewith. In an infrastructure BSS including an AP, communication between non-AP STAs is basically performed via the AP. If a direct link has been set up between non-AP STAs, however, the non-AP STAs may directly communicate with one another. The AP may also be called another terminology, such as a centralized controller, a Base Station (BS), a node-B, a Base Transceiver System (BTS), or a site controller.

A plurality of infrastructure BSSs may be interconnected through a Distribution System (DS). The plurality of BSSs coupled through the DS is called an Extended Service Set (ESS). STAs included in the ESS may communicate with one another. A non-AP STA may move from one BSS to the other BSS while performing seamless communication within the same ESS.

The DS is a mechanism for enabling one AP to communicate with the other AP. According to this mechanism, an AP may transmit a frame for STAs associated with a BSS managed by the AP, transfer a frame if one STA has moved to another BSS, or transfer a frame to an external network, such as a wired network. The DS does not need to be necessarily a network, and it may have any form if the DS can provide specific distribution service defined in IEEE 802.11. For example, the DS may be a wireless network, such as a mesh network, or a physical structure for coupling APs.

Figure 3:
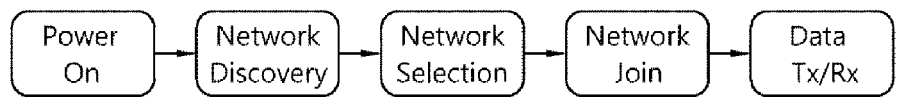
FIG. 3 shows a schematic process until any wireless apparatus in a wireless communication system starts operating and transmits and receives data over a wireless communication network.

FIG. 3 shows a schematic process until any wireless apparatus in a wireless communication system starts operating and transmits and receives data over a wireless communication network.

In a wireless communication system, in view of the characteristic of a medium on which a signal is transferred, when any STA is supplied with power and thus started, the STA is unable to immediately know the existence of a network. Accordingly, an STA must perform a process of searching for a target network when starting operating. The STA that has retrieved a network through the network search process selects the network through a network selection process.

Next, the STA is able to access the Internet (data transmission/reception) through a subscription procedure to the selected network.

Figure 4:
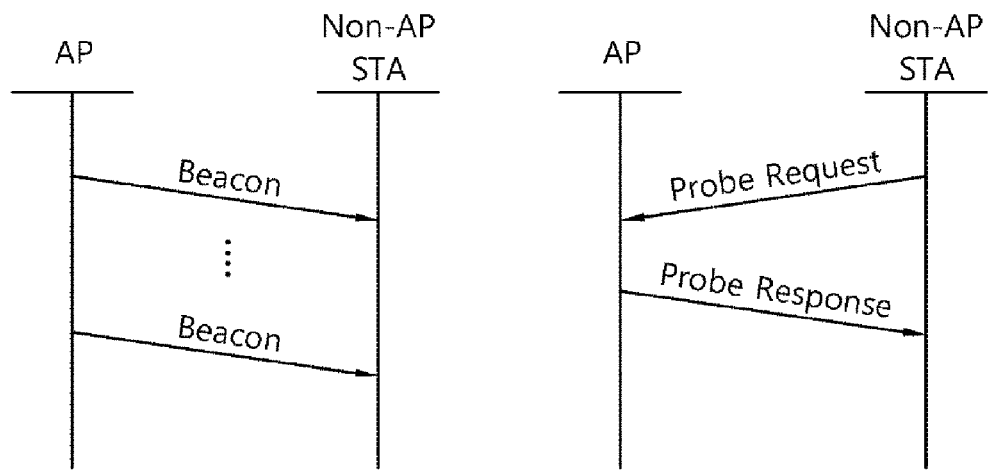
FIG. 4 illustrates a scanning procedure in a WLAN.

A network search procedure in a WLAN consists of a scanning procedure. FIG. 4 illustrates a scanning procedure in a WLAN.

The scanning procedure in the WLAN includes a passive scanning scheme and an active scanning scheme. The passive scanning scheme is performed through a beacon frame that is periodically (e.g., every 100 ms) broadcasted by an AP. Information about a current network is carried on the beacon frame. In order to obtain the information, an STA passively waits to receive the beacon frame in a relevant channel. The STA which has obtained the information about the network by receiving the beacon frame finishes scanning in the channel. In the passive scanning scheme, overall overhead may be reduced because an STA has only to receive a beacon frame without a need to send another frame, but the scanning execution time may be increased in proportion to the transmission period of the beacon frame.

In the active scanning scheme, an STA requests all APs from network information by actively transmitting a probe request frame to all the APs in a channel. An AP which has received the probe request frame waits for a specific time in order to prevent a collision between a frame transmitted by itself and a frame transmitted by another AP and transmits a probe response frame on which network information is carried to the STA. The STA may obtain the network information by obtaining the probe response frame. In the active scanning scheme, scanning may be finished within a relatively short time, but overall network overhead may be increased because additional frames need to be exchanged as compared with the passive scanning scheme.

After finishing the scanning process, the STA may select a network in which the STA may take part based on specific criteria. The AP may provide the STA with information on which the STA may make reference in selecting the network through the beacon frame or the probe response frame in the scanning process.

Figures 5, 6:
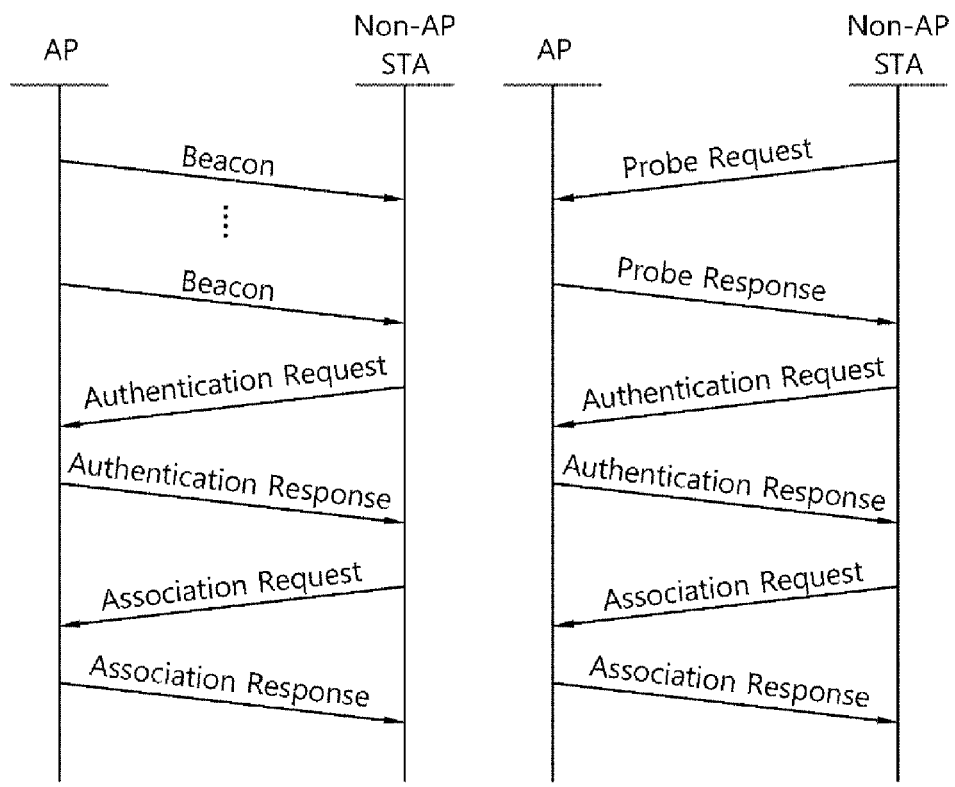
FIG. 5 schematically shows the authentication procedure and the association procedure which are performed after the scanning procedure of FIG. 4.
FIG. 6 is a block diagram showing an example of a format of an IE when type information of an STA is transmitted in the form of the IE.

Next, the STA performs a subscription procedure in the selected network. The subscription procedure in a WLAN system may include an authentication procedure and an association procedure. FIG. 5 schematically shows the authentication procedure and the association procedure which are performed after the scanning procedure of FIG. 4.

The authentication process may be performed by exchanging an authentication request frame and an authentication response frame. The STA and the AP perform mutual authentication through the authentication process and form association.

The association process may be performed by exchanging an association request frame and an association response frame. The STA transmits the association request frame to the AP with which the STA will be associated. The transmitted association request frame includes information about capability Information of the STA. The AP determines whether support for the STA is possible based on the capability information. The AP transmits the association response frame, including information about a grant to the association request, a reason of the grant, and supportable capability information, to the STA. If the association is formed, subsequent frames may be transmitted and received. If the association is rejected, the STA may try to attempt the association process again to the AP or attempt association with another AP on the basis of the rejected reason.

After the association is formed between the STA and the AP, STAs within a BSS attempt to access a channel. An STA successful in channel access transmits and receives frames. A channel access method in a WLAN system is chiefly divided into a contention-free scheme and a contention scheme.

In a WLAN system using a contention scheme, a plurality of STAs may transmit frames by accessing a Wireless Medium (WM) through contention. In an environment in which a number of STAs are connected to one AP, each STA may experience difficult channel access owing to keen contention. Accordingly, in the environment in which a number of STAs are connected to one AP, to use a new channel access scheme may need to be taken into consideration. The present invention proposes a channel access method based on a group and a method of transmitting management information for supporting the channel access method. The channel access method to be described below may be usefully applied to an environment in which a number of STAs are connected to one AP. The present invention is described assuming the above environment, but not limited thereto.

Meanwhile, a Machine-to-Machine (M2M) system has recently been in the spotlight as the next-generation communication technology. M2M means a network over which a machine not humans becomes the main body of communication and exchanges pieces of information. A sensor, such as a temperature sensor or a humidity sensor, an electric home appliance, such as TV or a camera, a process machine in the factory, or a large-sized machine, such as a vehicle, may become one of the elements of M2M. With the recent advent of various communication services, such as smart grid, e-Health, and ubiquitous, M2M technology for supporting the various communication services has been in the spotlight. An M2M system has the following characteristics.

1) A very large number of STAs: M2M assumes a very large number of STAs unlike the existing network. This is because not only machines owned by persons, but also sensors installed in homes and companies must be taken into consideration. Accordingly, a very large number of STAs may be connected to one AP.

2) Low traffic load per STA: An M2M terminal has a traffic pattern in which surrounding information is collected and reported. Accordingly, information does not need to be frequently transmitted, and the amount of the information is small.

3) Uplink-oriented: M2M is chiefly configured to receive a command in downlink, take action, and then report resulting data in uplink. Thus, uplink becomes the center in M2M because major data is commonly transmitted in uplink.

4) Longer lifespan of an STA: An M2M terminal is chiefly operated by the battery, and a user may not frequently charge the M2M terminal. Accordingly, it is necessary to guarantee a longer life span by minimizing the consumption of the battery.

5) Automatic recovery function: An M2M terminal needs an automatic recovery function because it is difficult for a person to directly manipulate the M2M terminal in a special situation.

When WLAN technology is applied to an M2M system, the M2M system having a very large number of STAs may be characterized in that it has an environment in which a number of STAs are associated with one AP. When the above characteristic (particularly, an environment characteristic in which a very large number of STAs are connected an AP) of the M2M system may become an embodiment to which the proposed method of the present invention may be effectively applied. In this aspect, in describing various embodiment of the present invention, an M2M system is described as an example, for convenience of description. However, the contents proposed by the present invention are not limited to the M2M system, but may be applied to a WLAN systems and a variety of wireless communication systems.

An environment in which a very large number of STAs are associated with one AP may be influenced by a frequency band used in a WLAN system. If a WLAN is used in a frequency band of less than 1 GHz represented as 700 to 900 MHz unlike in the existing 2.4 GHz or 5 GHz, the coverage of an AP to the same transmission power is extended about 2 to 3 times because of the propagation characteristic of the frequency band. When the coverage of the AP is extended, a large number of STAs may access one AP because the geographical area of an STA that may be associated with the AP is increased. A Carrier Sense Multiple Access with Collision (CSMA/CA) avoidance scheme in which an STA transmits data by randomly accessing a channel based on contention through a Carrier Sensing (CS) mechanism for a Wireless Medium (WM) may be used in a WLAN system. If a large number of STAs contend with one another in order to access a wireless medium at the same time in a WLAN system, the system may not be properly operated because a collision probability is increased. In order to solve this problem, it is necessary to limit the number of STAs which contend with one another at once. That is, an opportunity to take part in contention at a specific time is given to specific STAs so that the STAs are precluded from taking part in contention except the time. STAs may be grouped based on an opportunity to attempt contention. The occurrence of a collision may be reduced by lowering a contention level through STA grouping.

If STA grouping is not performed based on special information or criteria, but is randomly performed, STAs which need to transmit data by rapidly accessing a medium owing to an emergency situation or a special event may not be given a right to attempt contention or may be given a grant to take part in contention after a lapse of plenty of time. In order to solve this problem, in accordance with an embodiment of the present invention, an AP may transmit a message (hereinafter referred to as a 'Channel Access Control (CAC)' message), limiting the number of STAs so that only a limited number of specific STAs can take part in contention during a specific interval, or may transmit a schedule information message, providing information about the time when the CAC message will be transmitted, to STAs within a BSS. The CAC message or the schedule information message may be transmitted through a separate management frame or may be transmitted through a beacon frame that is periodically transmitted by an AP. When the CAC message is transmitted through the beacon frame, STAs which have received the beacon frame take part in contention for accessing a medium only during a specific contention interval that is allowed for a group to which the STAs belong based on the CAC message. From a viewpoint of a WLAN system, since a number of STAs perform contention for accessing a medium in an allowed and specific interval by group, a collision probability that may occur because a number of STAs participate in contention at the same time can be reduced.

In an embodiment of the present invention in which a number of STAs are grouped and allowed for contention for accessing a channel by group, an AP may take the characteristics of non-AP SATs into consideration when grouping the STAs. Groups for respective types of STAs may be designated by grouping the STAs based on the types of the STAs. A type of an STA may be determined according to an application implemented in the STA, a traffic pattern, a duty cycle, location information, and a listen interval of the STA. STAs may provide an AP with type information on which the AP can group the STAs with reference to types of the STAs. For example, an STA may provide an AP with a probe request frame or an association request frame to which type information is added.

An AP may configure a variety of STA groups on the basis of type information of each of STAs which are accessing the AP. The AP may transmit group index information to each STA. The group index information may be transmitted in the form of a management frame or an Information Element (IE) for transmitting the group index information. The IE including the group index information may be included in a probe response frame or an association response frame and then transmitted. Next, the AP may set a contention period for each group by triggering a group-specific contention period by STA group index.

An example in which STA type information and group index information are transmitted, together with examples of formats of the STA type information and the group index information, is described in detail.

FIG. 6 is a block diagram showing an example of a format of an IE when type information of an STA is transmitted in the form of the IE.

When type information (e.g., an application, a traffic pattern, a duty cycle, location information, and listen interval) of STAs is added to a probe request frame or an association request frame and then provided to an AP, an STA Type element of FIG. 6 may be defined and used.

The STA Type element may include an Element ID field, a Length field, and an STA Type Info field. The Element ID is an identifier of the present element, and it may indicate that the IE includes type information of an STA. The Length field may indicate the length of the IE or the length of the field subsequent to the IE. Information carried on the STA Type Info field may be defined in various ways. A value set in the STA Type Info field may have a predetermined table form. For example, the value may include information to indicate a gas meter, a water meter, or a power meter for each application of an STA. More specifically, pieces of information, such as a traffic pattern, a duty cycle, location information, and a listen interval, may be defined in an optimized table form and used.

FIG. 7 shows an example of a format of the STA Type Info field.

In the example of FIG. 7, the STA Type Info field is illustrated as including STA Type information, Duty Cycle, and Listen Interval information, but this is only an example. The STA Type Info field may include various pieces of information to which an AP may make reference in order to group STAs by classifying types of the STAs.

In the example of FIG. 7, the STA Type field may transfer information about whether an application of an STA is a gas meter, a water meter, or a power meter. In addition, the STA Type field may provide information about the location of an STA and information related to traffic.

FIG. 8 shows a detailed example of pieces of information that may be included in the STA Type field of FIG. 7.

Table 1 shows an example in which application bits values of FIG. 8 are set. The application bits values may be determined in a table form, such as that shown in Table 1.

TABLE 1

| Subtype Value B0 B1 | Subtype Description |
|---|---|
| 00 | Gas meter |
| 01 | Water meter |
| 10 | Power meter |
| 11 | Reserved |

Table 2 shows an example in which traffic bits values of FIG. 8 are set.

TABLE 2

| Subtype Value B2-B4 | Subtype Description |
|---|---|
| 000 | Traffic pattern A |
| 001 | Traffic pattern B |
| 010 | Traffic pattern C |
| 011 | Traffic pattern D |
| 100-111 | Reserved |

Table 3 shows an example in which location bits values are set.

TABLE 3

| Subtype value B5-B7 | Subtype description |
|---|---|
| 000 | Location area A |
| 001 | Location area B |
| 010-111 | Reserved |

For example, if the bitmap of the STA Type field is [1 0 0 1 0 0 0 1], it means that an STA has "power meter, traffic pattern=C, location=area B". Each of a Duty Cycle [%] element and a Listen Interval element may be a value represented by a 2 octet size. The pieces of information are only illustrative, for convenience of description, and the STA Type Info field may be optimized and implemented in various forms.

The STA Type element may be included in an association request frame format and then transferred from an STA to an AP. Alternatively, the STA Type element may be included in a probe request frame format and then transferred from an STA to an AP. In this case, at the time of a subsequent association request, the STA Type element may be defined as being excluded from the frame format, but may be redundantly included in the frame format. In this case, the contents of the most recent STA Type element may be defined as being valid. Contents regarding the association request in the above contents may be likewise applied to a reassociation request. That is, even when the reassociation request is made, the STA Type element may be included in the frame format.

After receiving the STA Type element through a frame, such as a probe request frame or an association request frame, an STA (or AP) forms various STA groups based on the information and may transfer a probe response or an association response, including group index information about a group to which each STA belongs.

FIG. 9 is a block diagram of an example of a format of a Group Index element including group index information.

The size of the Group Index field may be variable and may be indicated by Length. Information loaded onto the Group Index field may include information indicating a group to which an STA which has received the Group Index element belongs. For example, the size of the Group Index field may be a bit string equal to the total number of groups which are now present. More specifically, a bitmap form using a method of including information about one group index in each 1 bit and informing whether an STA belongs to the group through the 1 bit may be used.

Figure 10:
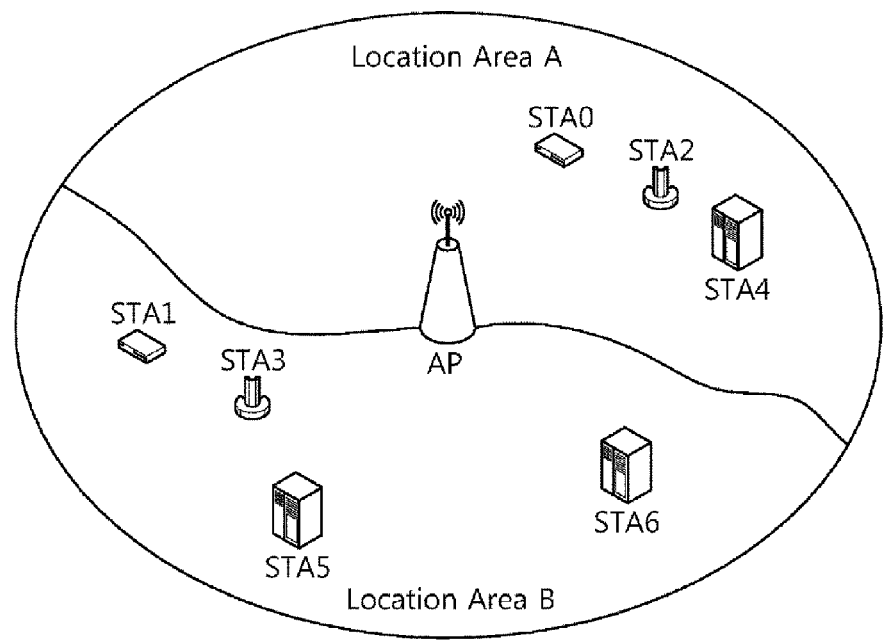
FIG. 10 shows STAs associated with an AP.
Figure 10:
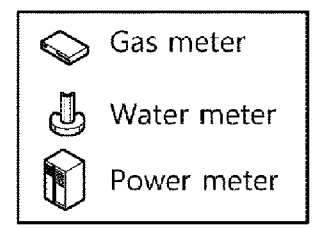

For example, it is assumed that a total of 7 STAs (STA0 to STA6) are associated with an AP, as shown in FIG. 10, and 5 types of groups exist and the STAs belong to the 5 groups as shown in Table 4.

TABLE 4

| Group and Type | Belonging STA |
|---|---|
| Group#0: STAs, that is, Gas meters | STA0, STA1 |
| Group#1: STAs, that is, Water meters | STA2, STA3 |
| Group#2: STAs, that is, Power meters | STA4, STA5, STA6 |
| Group#3: STAs, that is, Gas/Water/Power meters belonging to Location area A | STA0, STA2, STA4 |
| Group#4: STAs, that is, Gas/Water/Power meters belonging to Location area B | STA1, STA3, STA5, STA6 |

In the example of FIG. 10, since the number of groups is 5 the size of the Group Index field represented by a bitmap may be 5 bits. If an STA belongs to a relevant group, the bitmap of the Group Index field transferred to each of the STAs may have a form, such as that shown in Table 5, when each STA is defined by '1' or '0'.

TABLE 5

| STA | Example in which the Group Index field is set in a bitmap form |
|---|---|
| STA0 | [1 0 0 1 0] |
| STA1 | [1 0 0 0 1] |
| STA2 | [0 1 0 1 0] |
| STA3 | [0 1 0 0 1] |
| STA4 | [0 0 1 1 0] |
| STA5 | [0 0 1 0 1] |
| STA6 | [0 0 1 0 1] |

The setting of the Group Index field value in Table 5 is only an embodiment, and the Group Index field may be set in various forms, informing an STA of a group to which the STA belongs.

The Group Index element according to an embodiment of the present invention may be included in an association response frame format and then transferred from an AP to an STA. Alternatively, the Group Index element may be included in a probe response frame format and then transferred from an AP to an STA. In this case, at the time of a subsequent association response, the Group Index element may be defined as being excluded from the frame format, but redundantly included in the association response. In this case, the contents of the most recent Group Index element may be defined as being valid. Contents regarding the association response in the above contents may be likewise applied to a reassociation response. That is, even when the reassociation response is made, the Group Index element may be included in the frame format.

The messages which provide pieces of STA type information, such as the STA Type element and the Group Index element, and inform a belonging group, may be exchanged in a probe/association stages and also transmitted in the form of an action frame when a change of information is generated so that the pieces of information can be updated. That is, an AP may wish to newly add a group index or to change a group to which a specific STA belongs. In this case, according to an embodiment, a group indication action frame may be defined in order to update relevant information.

Table 6 shows an example of a format of the group indication action frame.

TABLE 6

| Order | Information |
|---|---|
| 1 | Category |
| 2 | Action |
| 3 | Group Index |

Group Index shown in Table 6 may be identical with the Group Index element described in the above embodiment. An STA which has received the group indication action frame may update group index information about a group to which the STA belongs. The group indication action frame may be transmitted to each STA in unicast.

For another example, an AP may transfer Group Indication information through a beacon frame. That is, for example, when a message is transferred to only a specific STA in unicast through a beacon frame, a Group Index field, together with information capable of indicating the specific STA, may be included in the beacon frame format and then transmitted. The information capable of indicating the specific STA may be the Association ID (AID) of the specific STA, a partial AID, or a MAC address of the specific STA. When some STAs are informed of updated Group Indication in multicast, an element generated by sequentially connecting relevant Group Index field values as many as the number of the STAs, together with STA ID information, may be included and transmitted. Likewise, the Group Indication may also be broadcasted to all STAs according to the above method.

The group decision and the method of providing the pieces of information necessary for the group decision includes including the STA Type element in an association (or reassociation) request frame format or a probe request frame format, transmitting the association (or reassociation) request frame or the probe request frame to an AP in order to provide STA type information to the AP when the STA initially accesses the AP, the AP determining a group to which the STA will belong based on the STA Type element, including the Group Index element in an association (or reassociation) response frame format or a probe response frame format, and transmitting the association (or reassociation) response frame or the probe response frame to the STA.

As another embodiment of the present invention, a method in which an AP first provides each STA with information about an STA group and an STA which has received the information returns group index information about a group to which the STA wants to belong to the AP is described below. Here, the AP may finally approve whether to include the STA in the group to which the STA wants to belong.

An AP may provide STAs with information including all common STA type characteristics regarding groups now present.

Figure 11:
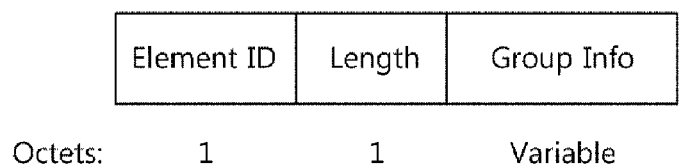
FIG. 11 shows a Group Info element format which may be used as an example of a method in which an AP transmits current group information.

FIG. 11 shows a Group Info element format which may be used as an example of a method in which an AP transmits current group information.

The size of the Group Info field of the Group Info element may be variable and may be indicated by a Length field. The Group Info field may include information including all common STA type characteristics regarding groups now present. As an example of the setting of the Group Info field value, a method of sequentially including the pieces of group-related information in the bit string of a specific and fixed size starting from a group index #0 and repeatedly mapping the pieces of group-related information may be used. Here, size information about the bit string may also be included in the Group Info field.

The Group Info element may be included in a beacon frame and broadcast. An STA trying to attempt to access an AP according to the passive scanning scheme may receive a beacon frame broadcasted by the AP and know the current characteristic of each group by analyzing a Group Info element included in the received beacon frame. The STA may transmit information indicating a group to which the STA wants to belong, from among groups now present, to the AP. The information indicating the group may be a group index.

When the group index is transmitted to the AP, the Group Index element of FIG. 11 may be used. The Group Index element may be included in an association request frame. The AP may respond by including the Group Index element in an association response frame. If the AP has responded using the same Group Index element field value, it may mean that the request of the STA has been received and the STA has been grouped. If the AP has responded using a different Group Index element field value, it may mean that the AP has changed grouping according to a situation differently from the request of the STA and has notified the final result.

If an STA tries to attempt to access an AP according to the active scanning scheme, the STA transmits a probe request frame to the AP. In response to the probe request frame, the AP may include the proposed Group Info element in a probe response frame when transmitting the probe response frame. In response to the probe response frame, the STA may analyze the Group Info element included in the probe response frame, include group index information about a group to which the STA wants to belong in the Group Index element, include the group index information in an association request frame, and then transmit the association request frame to the AP. In response to the association request frame, the AP may respond likewise by including the Group Index element in an association response frame.

A channel access scheme based on a group, wherein an AP sets a group-specific contention period by STA group and avoids a collision by triggering the group-specific contention period in a WLAN system in which a large number of STAs may be associated with one AP, is described below.

FIG. 12 shows an example of a Channel Access Control (CAC) Information Element (IE) format which may be used in the channel access method based on a group.

When the CAC IE is transmitted, only STAs corresponding to a specific STA group indicated by the CAC IE may contend with one another in order to occupy a medium for a specific time interval. Accordingly, STAs which have received the CAC IE may check whether they belong to a relevant group based on a group index and contend with one another for a time interval indicated by the relevant element. STAs not corresponding to the group cannot participate in the contention, and thus a contention window size for CSMA/CA is not reduced. That is, although the STAs not belonging to the group do not operate random back-off, assuming that a medium is busy although the medium is idle for a specific interval.

The contention period allowed for only an STA belonging to a specific group may be represented by a CAC offset and CAC duration. The contention period may be indicated by setting a CAC Offset field informing the start time of the contention period after a relevant information element is transmitted and a CAC Duration field indicating the duration of the contention period. The CAC IE may be included in a beacon frame and transmitted. After the beacon frame is transmitted, only an STA belonging to a group indicated by a group index may participate in contention for accessing a medium for duration indicated by the CAC Duration field starting from the time indicated by the CAC Offset field. An STA not belonging to the group indicated by the group index sets a Network Allocation Vector (NAV) and defers access to the medium for the period indicated by the CAC Duration field starting from the time indicated by the CAC Offset field. The beacon frame may include a plurality of independent CAC IEs. If the plurality of CAC IEs is included, a plurality of CAC periods (where only STAs belonging to a specific group contend with one another) is set within a beacon interval. The CAC IE may be transmitted through a frame (e.g., the CAC action frame) different from the beacon frame. The CAC action frame may be broadcasted.

The channel access method based on a group according to the present invention is advantageous in that an AP may control the number of STAs which contend with one another in order to access a channel. An AP may maintain and update groups of STAs which participate in contention by setting the Group Index field value of the CAC IE.

Figure 13:
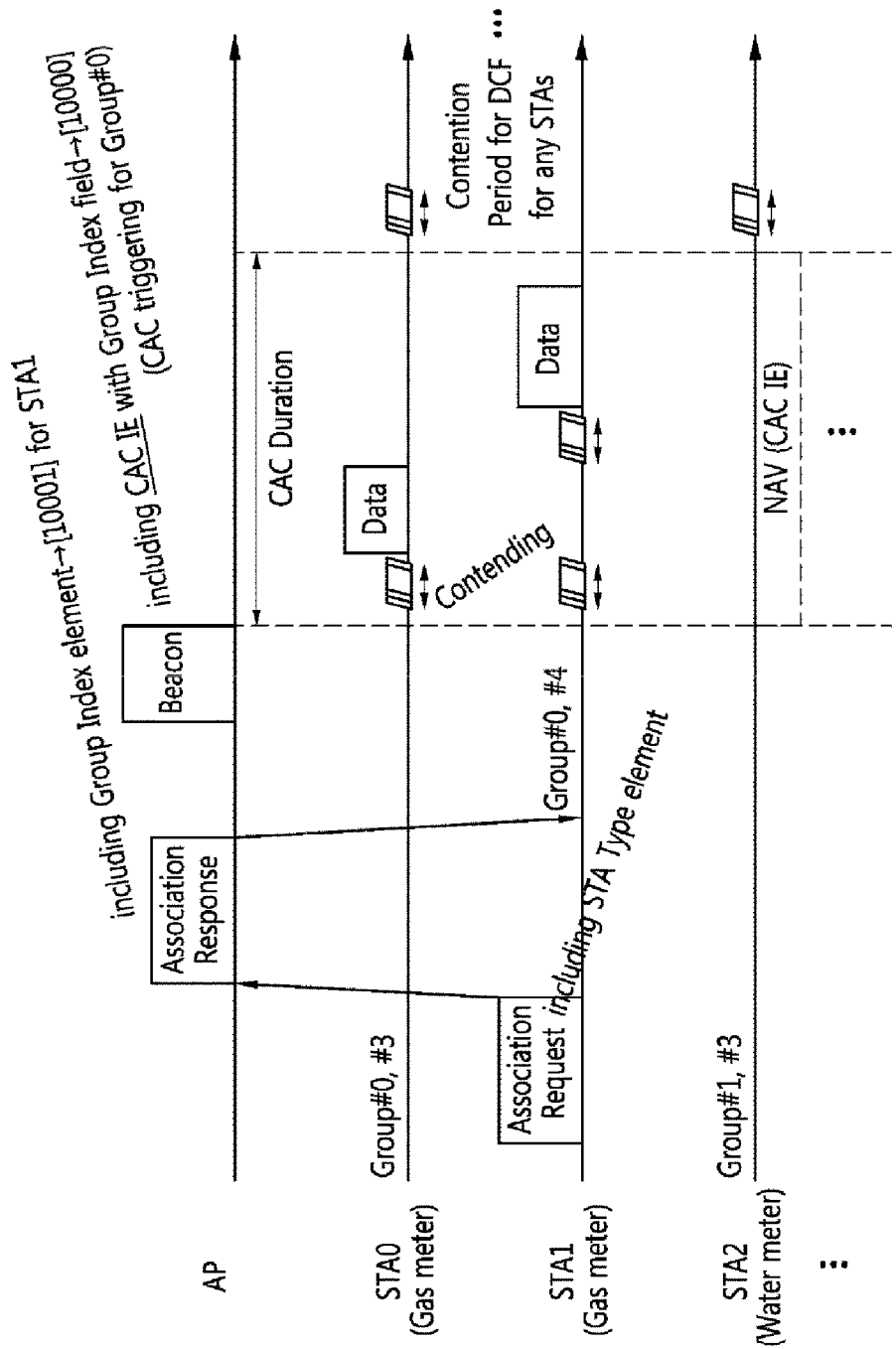
FIG. 13 shows a channel access method based on a group according to a lapse of time according to an embodiment of the present invention.

FIG. 13 shows a channel access method based on a group according to a lapse of time according to an embodiment of the present invention. In the example of FIG. 13, an STA0 and an STA2 are M2M terminals which are already connected to an AP, the STA0 belongs to Groups#0 and #3, and the STA2 belongs to Groups#1 and #3. Here, an STA1 tries to newly attempt to access the AP. The STA1 provides its own type information to the AP by transmitting an association request frame including an STA Type element to the AP. The AP which has obtained the type information of the STA1 transmits an association response frame, including a Group Index element, to the STA1. A Group Info field value included in the Group Index element is set to [1 0 0 0 1]. That is, the AP informs the STA1 that the STA1 is included in the Groups#0 and #4. The groups including the STA1 may be determined on the basis of the type information of the STA1. The STA1 checks that its own groups are #0 and #4 based on the Group Index element. Next, the AP transmits a beacon frame including a CAC information element. Here, the Group Index field value of the CAC IE has been set to [1 0 0 0 0]. That is, it means that only STAs belonging to the Group#0 content with each other for the CAC Duration. In this case, STAs belonging to groups other than the Group #0 set a NAV for the CAC Duration. After the CAC Duration is finished, other normal actions and contention-based channel access mechanisms may be operated.

Figure 14:
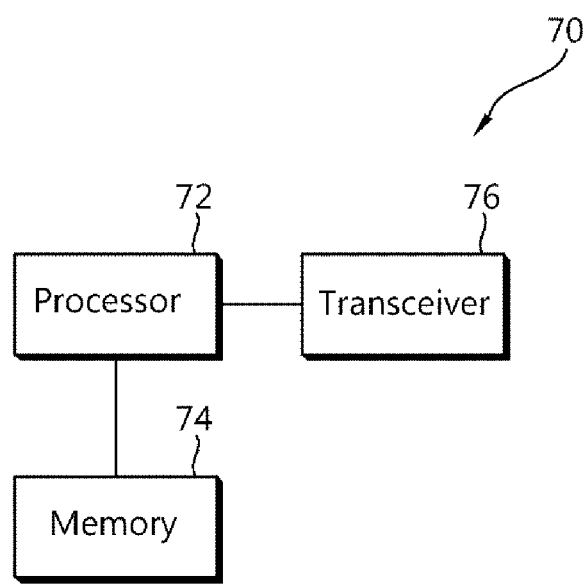
FIG. 14 is a block diagram of a wireless apparatus to which the embodiments of the present invention may be applied.

FIG. 14 is a block diagram of a wireless apparatus to which the embodiments of the present invention may be applied. The wireless apparatus 70 is a terminal capable of implementing the embodiments and may be an AP or a non-AP STA.

The wireless apparatus 70 includes a processor 72, memory 74, and a transceiver 76. The transceiver 76 transmits and receives radio signals, and the physical layer of IEEE 802.11 is implemented in the transceiver 76. The processor 72 is functionally connected to the transceiver 76, and it implements the MAC layer and the physical layer of IEEE 802.11. The processor 72 may be configured to generate and transmit a frame and IE for supporting the channel access scheme based on a group proposed by the present invention or to obtain information necessary for group-based channel access from the received frame and IE. The processor 72 may be configured to implement the embodiments of the present invention.

The processor 72 and/or the transceiver 76 may include Application-Specific Integrated Circuits (ASICs), other chipsets, logic circuits, and/or data processors. The memory 74 may include Read-Only Memory (ROM), Random Access Memory (RAM), flash memory, memory cards, storage media and/or other storage devices. When the embodiment is implemented in software, the above-described scheme may be implemented into a module (process or function) for performing the above-described functions. The module may be stored in the memory 74 and executed by the processor 72. The memory 74 may be placed inside or outside the processor 72 and connected to the processor 72 using a variety of well-known means. The above-described embodiments of the present invention are only for illustrating the technical spirit of the present invention, and the technical spirit of the present invention should not be construed as being limited by the embodiments. The scope of the present invention is specified by the following appended claims.

The invention claimed is:

1. A method for accessing a channel in a wireless local area network, the method comprising:
   transmitting, by a station, an association request frame to an access point (AP) for requesting an association with the AP, the association request frame including station type information for the station;
   receiving, by the station, an association response frame from the AP, in response to the association request frame, the association response frame including an identifier assigned by the AP;
   receiving, by the station, from the AP, channel access control (CAC) information for a restricted medium access to a group of stations within a contention period; and
   accessing, by the station, the channel within the contention period when the station is included in the group of stations,
   wherein the station type information includes information on characteristics of the station used by the AP to assign the identifier, and
   wherein the information on the characteristics of the station includes information on an application serviced by the station.

2. The method of claim 1, wherein the CAC information includes an group index, a CAC duration and a CAC offset, the group index including information indicating the identifier for the station included in the group that is allowed to access a channel within the contention period, the CAC duration indicating a duration of the contention period, the CAC offset indicating a start time of the contention period.

3. The method of claim 2, wherein the CAC information is received via a beacon frame.

4. The method of claim 1, wherein the information on the application serviced by the station includes information on a meter type service of the station.

5. The method of claim 4, wherein the information on the characteristic of the station further includes information on a traffic service processed by the station.

6. The method of claim 1, wherein the the identifier included in the association response frame includes information on an association identifier (AID) of the station.

7. A device configured for accessing a channel in a wireless local area network, the device comprising:
   a transceiver configured to receive and transmit radio signals; and
   a processor operatively coupled with the transceiver and configured to:
   instruct the transceiver to transmit an association request frame to an access point (AP) for requesting an association with the AP, the association request frame including station type information for the station;
   instruct the transceiver to receive an association response frame from the AP, in response to the association request frame, the association response frame including an identifier assigned by the AP;
   instruct the transceiver to receive, from the AP, channel access control (CAC) information for a restricted medium access to a group of stations within a contention period; and
   instruct the transceiver to access the channel within the contention period when the station is included in the group of stations,
   wherein the station type information includes information on characteristics of the station used by the AP to assign the identifier, and wherein the information on the characteristics of the station includes information on an application serviced by the station.

8. The device of claim 7, wherein the CAC information includes an group index, a CAC duration and a CAC offset, the group index including information indicating the identifier for the station included in the group that is allowed to access a channel within the contention period, the CAC duration indicating a duration of the contention period, the CAC offset indicating a start time of the contention period.

9. The device of claim 8, wherein the CAC information is received via a beacon frame.

10. The device of claim 7, wherein the information on the application serviced by the station includes information on a meter type service of the station.

11. A method for accessing a channel in a wireless local area network, the method comprising:
   receiving, by an access point (AP), an association request frame for requesting an association with the AP from a station, the association request frame including station type information for the station to request an identifier for the station;
   transmitting, by the AP, an association response frame to the station, in response to the association request frame, the association response frame including the identifier for the station assigned by the AP;
   transmitting, by the AP, channel access control (CAC) information for a restricted medium access to a group of stations within a contention period to the station,
   wherein the station type information includes information on characteristics of the station used by the AP to assign the identifier, and
   wherein the information on the characteristics of the station includes information on an application serviced by the station.

12. The method of claim 11, wherein the CAC information includes an group index, a CAC duration and a CAC offset, the group index including information indicating the identifier for the station included in the group that is allowed to access a channel within the contention period, the CAC duration indicating a duration of the contention period, the CAC offset indicating a start time of the contention period.

13. The method of claim 12, wherein the information on the application serviced by the station includes information on a meter type service of the station.

14. An access point (AP) configured for accessing a channel in a wireless local area network, the AP comprising:
   a transceiver configured to receive and transmit radio signals; and
   a processor operatively coupled with the transceiver and configured to:
   receive an association request frame for requesting an association with the AP form a station, the association request frame including station type information for the station to request an identifier for the station,
   transmit an association response frame to the station in response to the association request frame, the association response frame including the identifier for the station assigned by the AP, and
   transmit channel access control (CAC) information for a restricted medium access to a group of stations within a contention period to the station,
   wherein the station type information includes information on characteristics of the station used by the AP to assign the identifier, and
   wherein the information on the characteristics of the station includes information on an application serviced by the station.

15. The AP of claim 14, wherein the information on the application serviced by the station includes information on a meter type service of the station.

* * * * *